(12) United States Patent  (10) Patent No.: US 6,695,628 B2
Yeh  (45) Date of Patent: Feb. 24, 2004

(54) BATTERY CONNECTOR

(75) Inventor: Ryan Yeh, Chino Hills, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/150,855

(22) Filed: May 17, 2002

(65) Prior Publication Data

US 2003/0216067 A1 Nov. 20, 2003

(51) Int. Cl.[7] .................................................. H01R 1/00
(52) U.S. Cl. .......................... 439/83; 439/862; 439/500
(58) Field of Search .......................... 439/83, 862, 500, 439/502, 504, 943, 80, 733.1

(56) References Cited

U.S. PATENT DOCUMENTS 5,518,424 A * 5/1996 Douty et al. ................ 439/660
5,885,090 A * 3/1999 Comstock et al. ............ 439/65
6,022,248 A * 2/2000 Wu et al. .................... 439/862
6,113,440 A * 9/2000 Fijten et al. ................. 439/862
6,116,956 A * 9/2000 Wu .............................. 439/626
6,302,727 B1 * 10/2001 Fedorjaka .................... 439/500
6,454,607 B2 * 9/2002 Bricaud ....................... 439/630

* cited by examiner

Primary Examiner—Hien Vu
(74) Attorney, Agent, or Firm—Wei Te Chung

(57) ABSTRACT

A battery connector includes a number of connector blocks (1) each including an insulative housing (10) and a terminal (3) retained therein. The insulative housing has a mating face (11), opposite sidewalls (14) and a pair of slabs (16). Each sidewall and a corresponding slab define a passageway (17) therebetween. A pair of apertures (18) is defined through the sidewalls communicating with the passageways. The terminal includes a fixing portion (31) and a contact portion (30). The fixing portion includes a base section (32) and a pair of limbs (33) extending from the base section engaging with the passageways. Each limb forms a protrusion (331) thereon engaging with the aperture. The contact portion protrudes beyond the mating face to engage a terminal (50) of a rechargeable battery (5).

5 Claims, 6 Drawing Sheets

BATTERY CONNECTOR

CROSS-REFERENCE TO RELATED APPLICATION

This application is a co-pending application of patent applications with Ser. Nos. 10/150,729 and 10/150,846, respectively entitled "ELECTRICAL CONNECTOR WITH PIVOTABLE CONTACT" and entitled "BATTERY CONNECTOR WITH DUAL COMPRESSION TERMINALS", invented by the same inventor, filed on the same date, and assigned to the same assignee of the present invention.

BACKGROUND OF THE INVENTION

1. Field of the invention

The present invention relates to an electrical connector, and more particularly to an electrical connector used in a portable electronic device for connecting it with a battery received in the device.

2. Description of prior art

A battery connector used in a mobile phone or other portable apparatus typically comprises resilient electrical terminals that protrude beyond a mating face of a housing of the connector within which they are mounted. These terminals are biased into the housing when a battery is mounted in the apparatus and electrically connecting with the battery connector.

U.S. Pat. No. 6,113,440 discloses a battery connector retaining terminals in a housing thereof. The terminals project beyond a mating face of the housing to couple with complementary contacts. Each terminal forms a pair of downwardly extending tabs for being soldered to a printed circuit board (PCB). However, the tabs are too small to ensure a reliable secure soldering joint between the terminal and the PCB. The soldering joints between the terminals and the PCB may break down after a period of use of the connector, resulting in an unreliable connection between the battery and an apparatus incorporating the connector.

PCT International Publication No. WO 97/45900 discloses a battery connector adopted to connect a portable phone with a rechargeable battery. In this prior art reference, each terminal forms three branches at a distal end thereof. A middle branch is bent downwardly for being soldered on a printed circuit board, while the others are bent upwardly to extend into cavities of a housing of the conventional connector for retaining the terminal in the housing. However, the terminals of the connector employed by a portable phone are so tiny that it is difficult to form the three branches on each of the terminals. The branches are also too tiny to be securely retained in the housing.

Hence, an improved battery connector is requisite to overcome the disadvantages of the prior art.

BRIEF SUMMARY OF THE INVENTION

A main object of the present invention is to provide a battery connector which has terminals securely retained therein.

A battery connector in accordance with the present invention comprises a plurality of connector blocks each comprising an insulative housing and a resilient terminal received therein. The insulative housing has a mating face, a mounting face, opposite sidewalls and a pair of slabs. An interior chamber is defined in the housing and through the mating face and the mounting face. Each sidewall and a corresponding slab define a passageway therebetween. A pair of apertures is defined through the sidewalls communicating with the passageways.

The resilient terminal is received in the interior chamber and includes a fixing portion, a contact portion and a resilient portion connecting the fixing portion and the contact portion.

The fixing portion comprises a base section. A pair of limbs extends from the base section to engage respectively with corresponding passageways for locating the terminal in the housing. A pair of protrusions projects from the limbs to engage with the apertures, thereby securely retaining the terminal in the housing. The resilient portion extends upwardly from the fixing portion. The contact portion protrudes beyond the mating face to engage a terminal of a rechargeable battery.

Other objects, advantages and novel features of the invention will become more apparent from the following detailed description when taken in conjunction with the accompanying drawings.

DETAILED DESCRIPTION OF THE INVENTION

Figure 1:
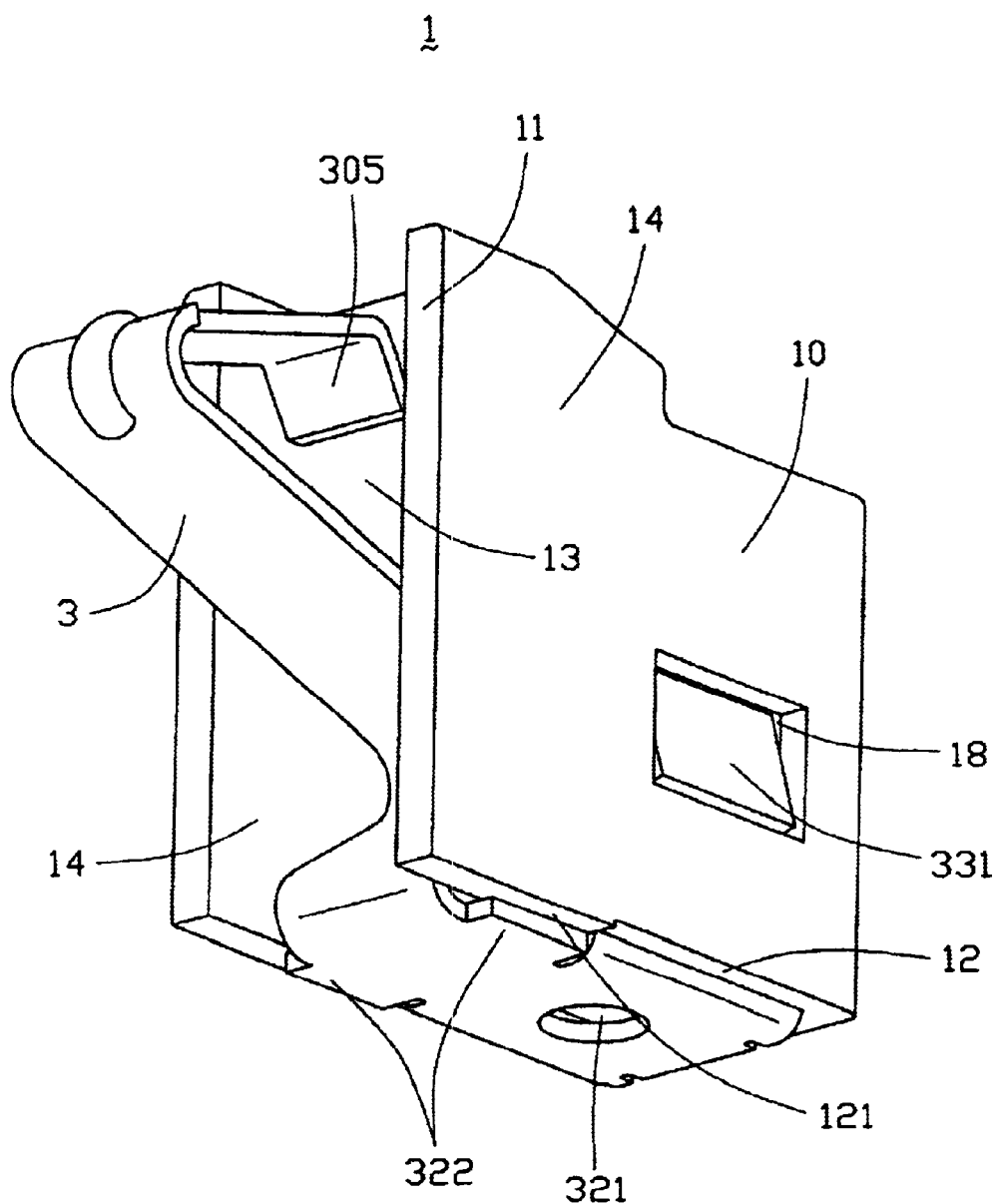
FIG. 1 is a perspective view of a battery connector block according to a first embodiment of the present invention.
Figure 2:
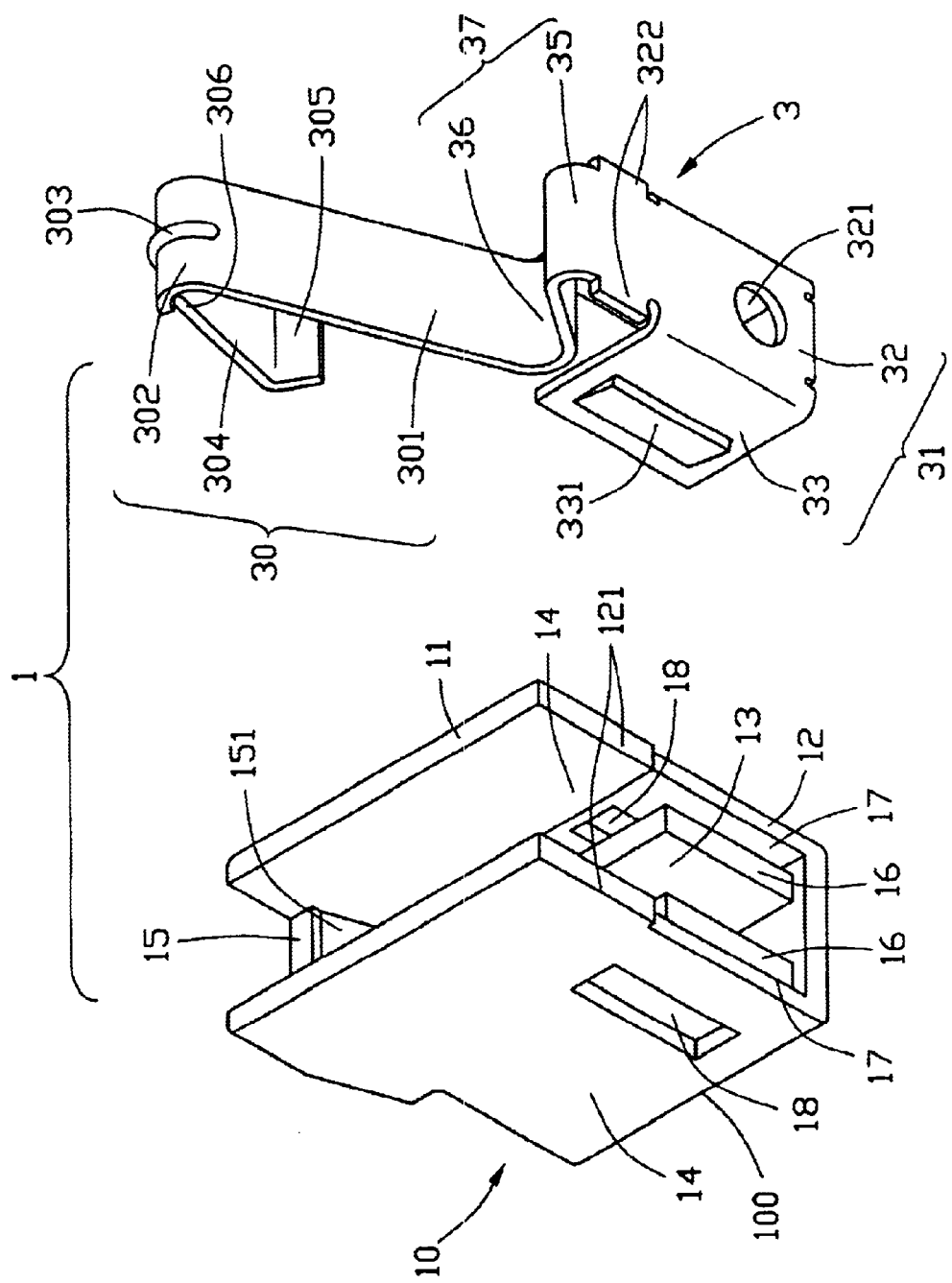
FIG. 2 is an exploded view of the battery connector block of FIG. 1.
Figure 3:
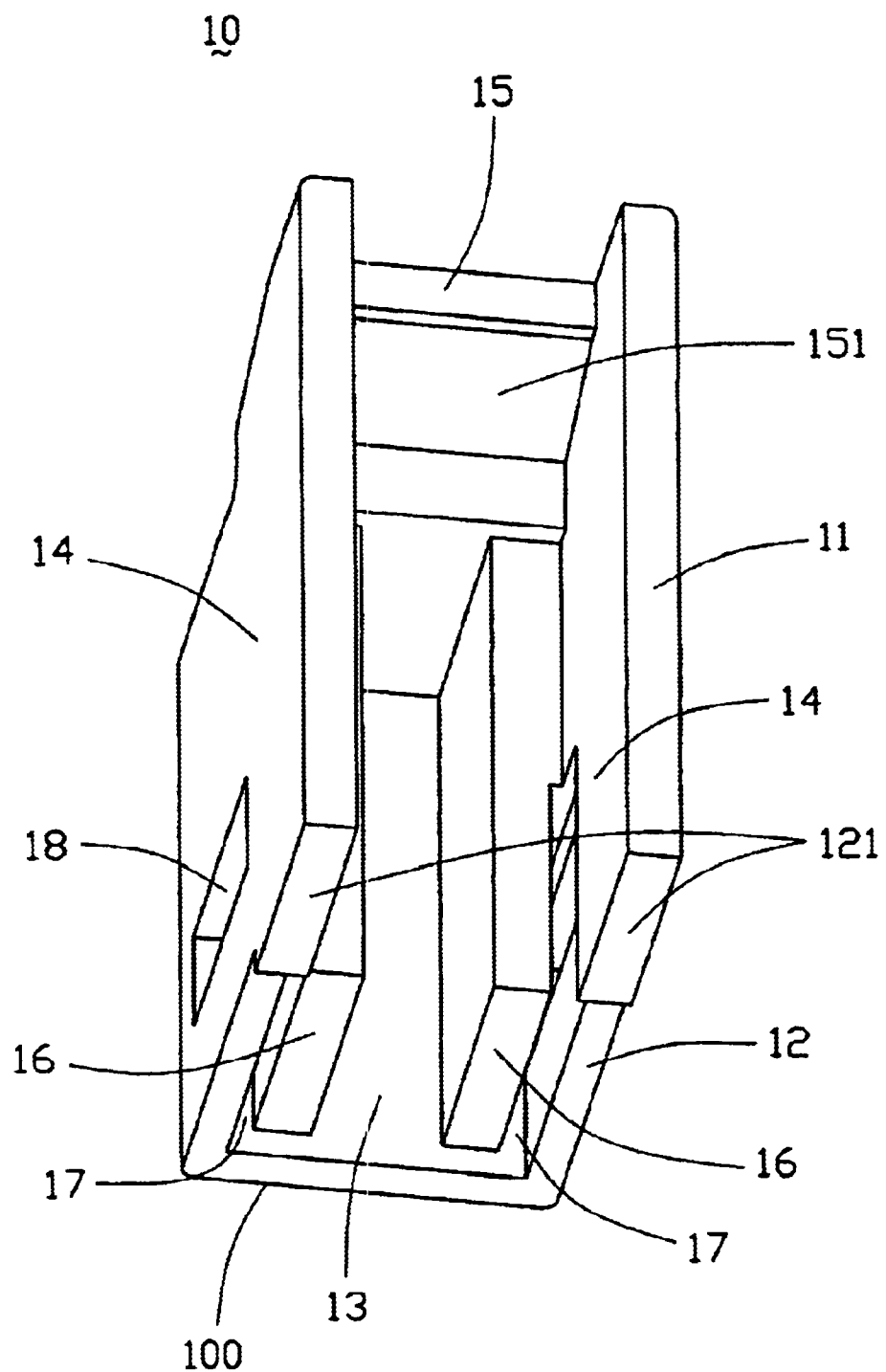
FIG. 3 is a perspective view of a housing of the battery connector block of FIG. 1.

Referring to FIGS. 1, 2 and 3, a battery connector block 1 according to a first embodiment of the present invention comprises an insulative housing 10 and a resilient terminal 3 received in the housing 10.

The housing 10 is substantially cubodial and comprises a front mating face 11, a rear wall 100, opposite sidewalls 14, a top wall 15 and a bottom mounting face 12. The mounting face 12 is perpendicular to the mating face 11 and the sidewalls 14. An interior chamber 13 is defined between the sidewalls 14, the top wall 15 and the rear wall 100 and through the front mating face 11 and the bottom mounting face 12 for receiving the terminal 3 therein. A pair of slabs 16 projects forwardly from an inner face of the rear wall 100 into the interior chamber 13 and connect with the sidewalls 14 at upper portions thereof. A pair of passageways 17 is defined between lower portions of the sidewalls 14 and the slabs 16, and opens to the bottom mounting face 12. A rectangular aperture 18 is defined through each sidewall 14 and communicates with the passageway 17. Each sidewall 14 forms a downwardly projecting step 121. The top wall 15 forms a slope 151 for facilitating inward and outward movements of the terminal 3 relative to the housing 10.

Figure 6:
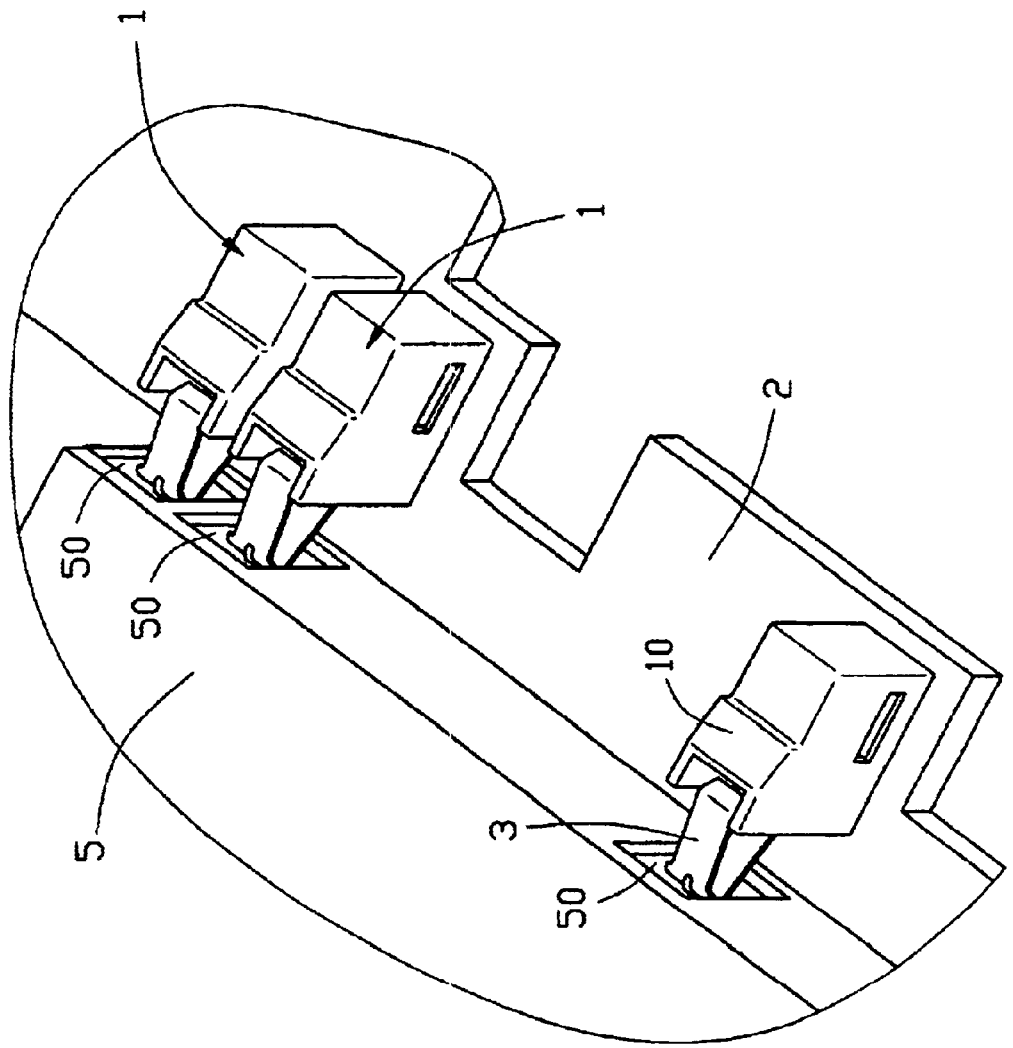
FIG. 6 shows battery connector consisting of three connector blocks of FIG. 1 for connecting with a battery.

The resilient terminal 3 is received in the interior chamber 13 for contacting with a terminal 50 of a rechargeable battery 5 (see FIG. 6). The terminal 3 comprises a fixing portion 31, a contact portion 30 and a zigzag resilient portion 37 connecting the fixing portion 31 with the contact portion 30.

The fixing portion 31 comprises a rectangular base section 32 for surface mounting onto a printed circuit board (PCB) 2 (FIG. 6). A pair of flanges 322 horizontally extends from opposite lateral edges of a front portion of the base section 32 to abut against the steps 121. A hole 321 is defined through a rear portion of the base section 32 for facilitating soldering of the terminal 3 to the PCB 2. The provision of the hole 321 promotes an efficient and accurate surface mounting process whereby excessive solder will not overflow beyond outer edges of the base section 32 of the terminal 3 resulting in a possible short circuit. A pair of rectangular limbs 33 extends perpendicularly and upwardly from the opposite lateral sides of the rear portion of the base section 32 to engage with corresponding passageways 17 for retaining the terminal 3 in the housing 10. A pair of wedge-shaped protrusions 331 projects outwardly from the limbs 33 to engage with corresponding apertures 18, thereby securely retaining the terminal 3 in the housing 10.

The resilient portion 37 provides the terminal 3 with flexibility to ensure an operation thereof within a predetermined elastically deformed range. The resilient portion 37 comprises a convex section 35 and a concave section 36. The convex section 35 extends forwardly from a front edge of the base section 32. The concave section 36 extends rearwardly from the convex section 35.

The contact portion 30 protrudes beyond the mating face 11 when the contact portion 30 is not connected with the terminal 50 of the battery 5. The contact portion 30 comprises a long arm 301, a short arm 304 opposite to the long arm 301 and a convex connection section 302 linking a front edge of the long arm 301 with the short arm 304, thereby forming an inverted V-shaped configuration. The long arm 301 extends from the concave section 36 in an inclined manner. A pair of cutouts 306 is defined in opposite sides of the short arm 304 for facilitating the inward and outward movements of the contact portion 30 relative to the housing 10 and preventing the contact portion 30 from rubbing inner faces of the sidewalls 14. A tab 305 extends rearwardly and downwardly from a rear edge of the short arm 304. A ridge 303 is formed on the convex connection section 302 of the terminal 3 and extends therealong. The ridge 303 ensures that the terminal 3 establishes a reliable contact with the terminal 50 of the battery 5.

In assembly, the terminal 3 is inserted into the interior chamber 13 with the contact portion 30 projecting beyond the mating face 11 of the housing 10 and the base portion 32 attached on the mounting face 12. Simultaneously, the limbs 33 are received into corresponding passageways 17 with the protrusions 331 engaging with corresponding apertures 18, and the flanges 322 abutting against corresponding steps 121.

Figure 4:
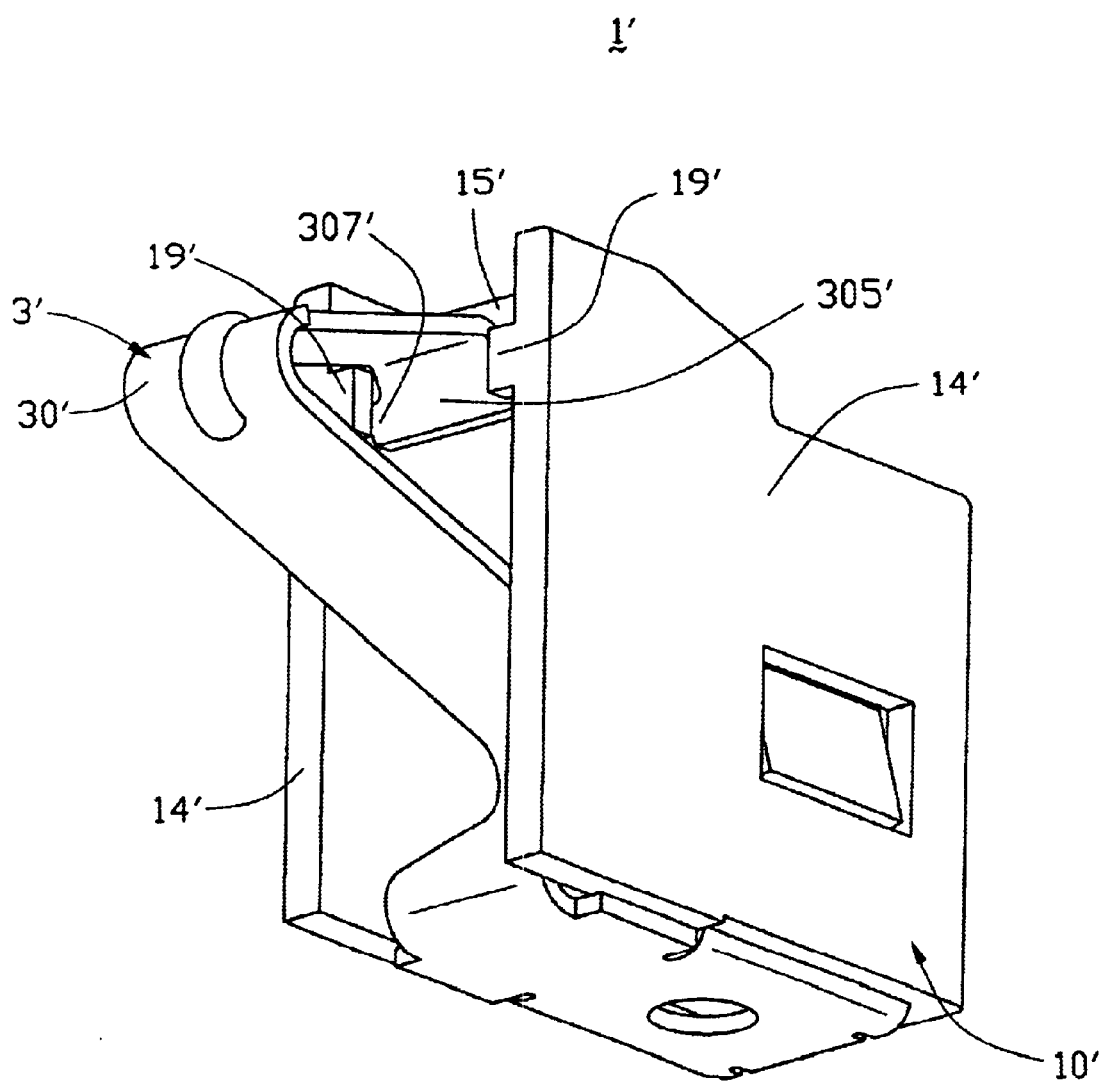
FIG. 4 is an perspective view of a battery connector block according to a second embodiment of the present invention.
Figure 5:
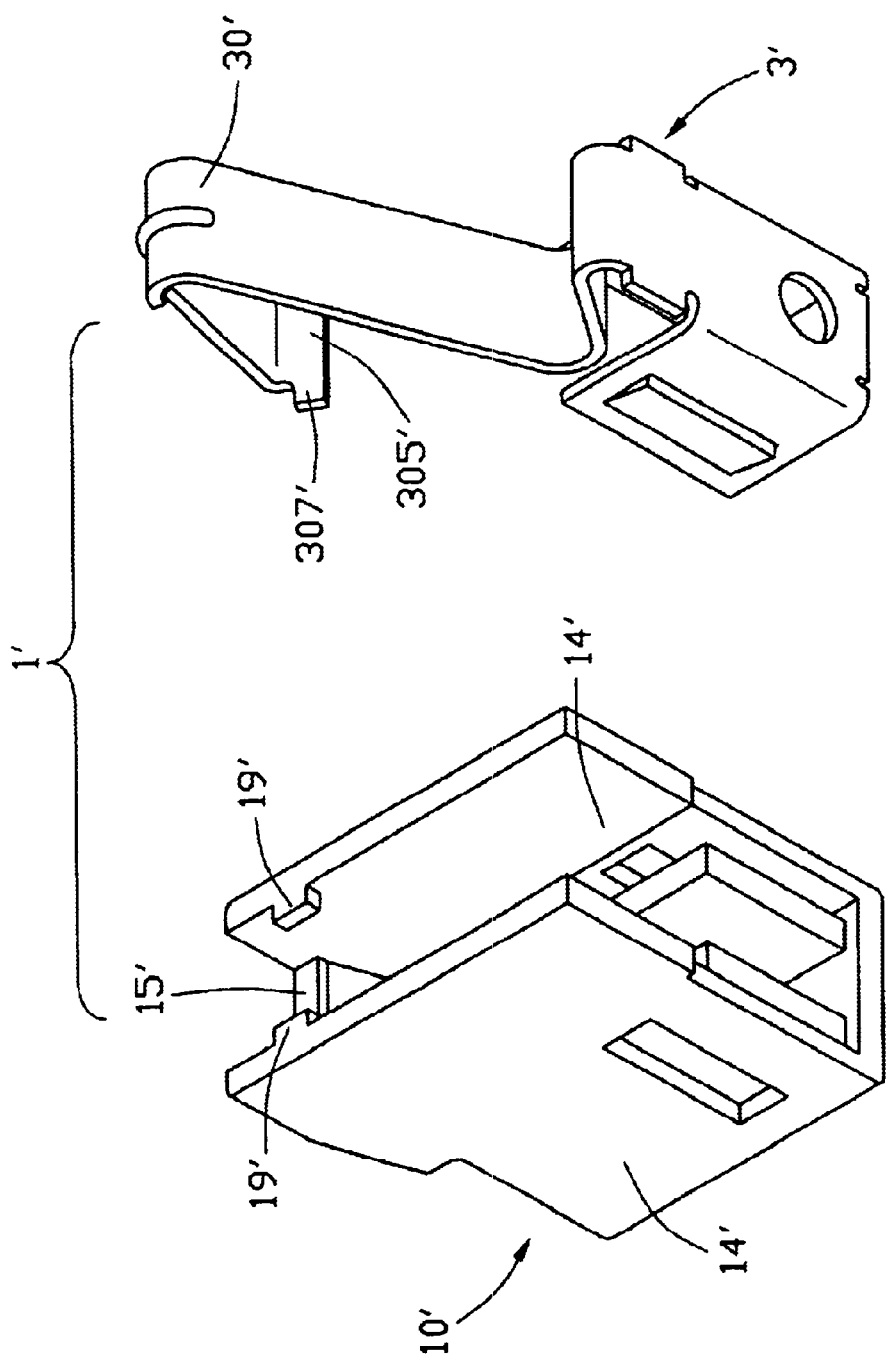
FIG. 5 is an exploded view of the battery connector block of FIG. 4.

FIGS. 4 and 5 show a battery connector block 1' according to a second embodiment of the present invention. For the purpose of securely locating the contact portion 30', the housing 10' can be provided with a pair of locating protrusions 19', and the contact portion 30' of the terminal 3' is provided with a pair of locating pieces 307' for engaging with the locating protrusions 19'. The locating protrusions 19' project from front portions of the inner faces of the sidewalls 14' adjacent to the top wall 15'. The locating pieces 307' project from opposite sides of the tab 305' to clasp the locating protrusions 19', thereby securely locating the contact portion 30' in the housing 10'.

In practical use, referring to FIG. 6, three connector blocks 1 of the first embodiment are soldered to the PCB 2 to form a battery connector for electrically connecting the rechargeable battery 5 with the PCB 2. The terminals 3 of the connector will be pushed rearwards by the terminals 50 of the battery 5 into the interior chambers 13 when the battery 50 is completely connected with the connector. The design of the slope 151 facilitates the inward and outward movements of the contact portion 30 relative to the housing 10, which is required to frequently mate/unmate with/from a corresponding terminal 50 of the battery 5. The provision of the slabs 16 in cooperation with the sidewalls 14 prevents lateral and vertical movements of the terminal 3 relative to the housing 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A connector block for an electrical connector comprising:
    an insulative housing having a mating face, a mounting face, sidewalls, an interior chamber defined through the mating face, and a passageway communicating with the interior chamber, each of the sidewalls defining an aperture therethrough communicating with the passageway; and
    a resilient terminal being substantially received in the interior chamber and comprising:
        a fixing portion comprising a base section adapted for soldering to a printed circuit board and a limb extending upwardly from the base section engaging with the passageway, the limb forming a protrusion thereon engaging with the aperture;
        a resilient portion extending from the fixing portion; and
        a contact portion extending from the resilient portion and protruding beyond the mating face; wherein
            the mounting face is perpendicular to the mating face, and the interior chamber extends through the mounting face; wherein
            the housing forms a slab projecting into the interior chamber and the passageway is defined between one of the sidewalls and the slab; wherein
            the housing forms projecting steps extending downwardly from edges of the mounting face, and wherein the base section of the fixing portion of the terminal forms flanges abutting against the steps.

2. The electrical connector block as claimed in claim 1, wherein the base section of the fixing portion of the terminal defines a hole therethrough adapted for facilitating the soldering of the base section to the printed circuit board by surface mounting technology.

3. The electrical connector block as claimed in claim 1, wherein the resilient portion of the terminal has a zigzag configuration and comprises a convex portion extending from the base section and a concave portion extending from the convex portion.

4. The electrical connector block as claimed in claim 1, wherein the contact portion of the terminal has an inverted V-shaped configuration and comprises a first arm extending from the base section, a second arm opposite to the first arm and a convex connection section linking the first arm and the second arm.

5. The electrical connector block as claimed in claim 4, wherein the second arm defines a pair of cutouts in opposite sides thereof for facilitating inward and outward movements of the contact portion relative to the housing and preventing the contact portion from rubbing the housing.

* * * * *